(12) United States Patent
Brown et al.

(10) Patent No.: US 11,798,702 B2
(45) Date of Patent: Oct. 24, 2023

(54) SYSTEM AND METHOD FOR COLLECTING AND ISOLATING RADIOSOTOPES

(71) Applicant: UCHICAGO ARGONNE, LLC., Chicago, IL (US)

(72) Inventors: Michael A. Brown, Chicago, IL (US); Artem Gelis, Naperville, IL (US); David Rotsch, Montgomery, IL (US); Jerry A. Nolen, Jr., Chicago, IL (US); Amanda J. Youker, Saint Charles, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 1092 days.

(21) Appl. No.: 16/554,048

(22) Filed: Aug. 28, 2019

(65) Prior Publication Data
US 2020/0082956 A1 Mar. 12, 2020

Related U.S. Application Data

(60) Provisional application No. 62/727,652, filed on Sep. 6, 2018.

(51) Int. Cl.
*G21G 1/12* (2006.01)
*G21K 5/08* (2006.01)
(Continued)

(52) U.S. Cl.
CPC ............ *G21G 1/12* (2013.01); *B01D 15/322* (2013.01); *B01D 15/363* (2013.01);
(Continued)

(58) Field of Classification Search
CPC ............ G21G 1/12; G21G 2001/0089; G21G 1/0005; G21G 1/001; B01D 15/322;
(Continued)

(56) References Cited

PUBLICATIONS

Wlodzimirska et al (Preparation of 225Ac and 228Ac generators using a cryptomelane manganese dioxide sorbent, Radiochimica Acta, 2003) (Year: 2003).*

(Continued)

*Primary Examiner* — Colin W. Slifka
*Assistant Examiner* — Logan Edward Laclair
(74) *Attorney, Agent, or Firm* — CHERSKOV FLAYNIK & CURDA, LLC

(57) ABSTRACT

A method for obtaining $^{225}$AC from $^{225}$Ra having the steps of assembling a column having an inorganic stationary phase; priming the column to immobilize $^{226}$Ra $^{225}$Ra and natural decay products therefrom; immobilizing the $^{226}$Ra, $^{225}$Ra, $^{224}$Ra, and natural decay products therefrom onto a stationary phase within the column; and eluting the column containing the $^{225}$Ra with an aqueous sulfate solution to obtain a milking effluent that contains $^{225}$AC. Also provided is a method for obtaining pure $^{225}$AC from its isotope parents, the method comprising assembling a column having a stationary phase comprising an inorganic material; priming the column with the isotope parents to immobilize $^{225}$Ac, and natural decay products of $^{225}$AC; immobilizing the $^{225}$Ac, and natural decay products therefrom onto the stationary phase within the column $^{226}$Ra, $^{225}$Ra, $^{224}$Ra; and eluting the column containing the $^{225}$AC to obtain an effluent that contains the isotope parents.

8 Claims, 9 Drawing Sheets

(51) Int. Cl.
  *C22B 3/42* (2006.01)
  *C22B 60/02* (2006.01)
  *B01D 15/36* (2006.01)
  *B01D 15/32* (2006.01)
  *B01J 20/02* (2006.01)
  *B01J 41/05* (2017.01)
  *B01J 41/10* (2006.01)
  *G21G 1/00* (2006.01)

(52) U.S. Cl.
  CPC ........... *B01J 20/0211* (2013.01); *B01J 41/05* (2017.01); *B01J 41/10* (2013.01); *C22B 3/42* (2013.01); *C22B 60/02* (2013.01); *C22B 60/0295* (2013.01); *G21K 5/08* (2013.01); *G21G 2001/0089* (2013.01)

(58) Field of Classification Search
  CPC ..... B01D 15/363; B01J 20/0211; B01J 41/05; B01J 41/10; C22B 3/42; C22B 60/02; C22B 60/0295; G21K 5/08
  See application file for complete search history.

(56) References Cited

PUBLICATIONS

Studies on Fundamental Properties of Alumina Adsorbent for Radio-isotope Production, Journal of Nuclear Science and Technology, 1969) (Year: 1969).*
Geerlings et al (The feasibility of 225Ac as a source of a-particles in radioummunotherapy, Nuclear Medicine Communications, 1993) (Year: 1993).*
F. Nelson, K.A. Kraus, J. Am. Chem. Soc., 1954, vol. 76, p. 5916-5920, 1954.

* cited by examiner

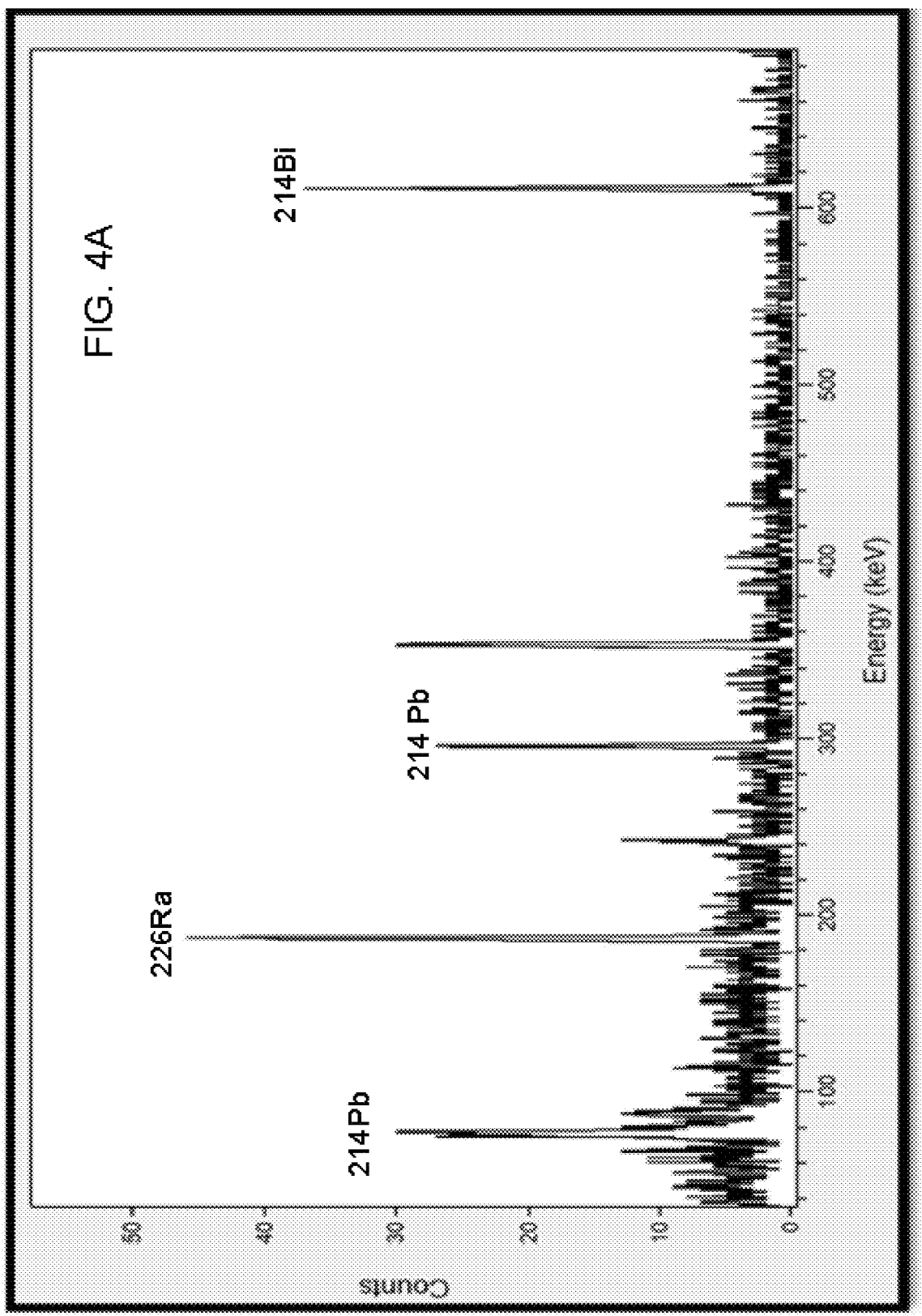

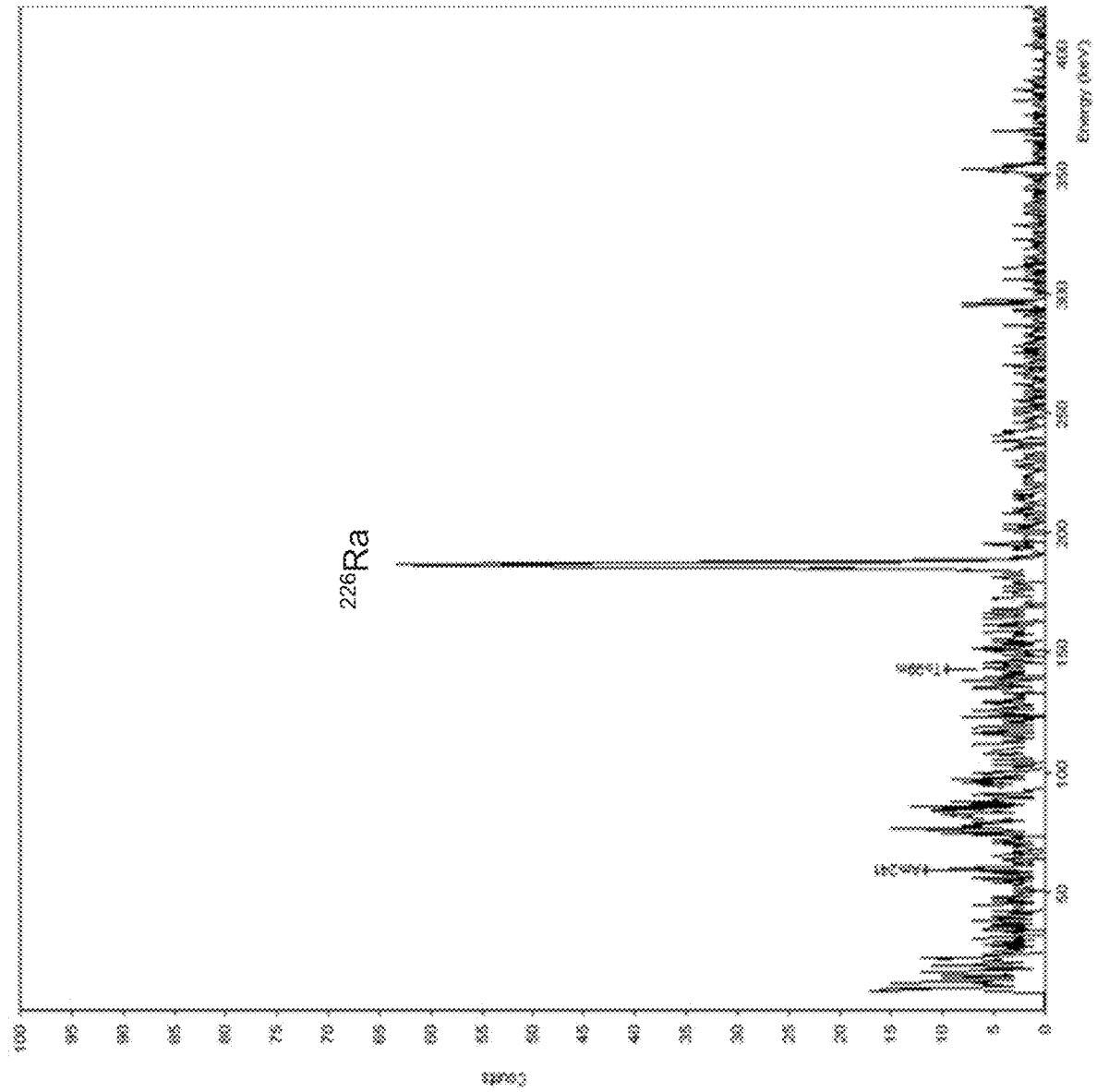

SYSTEM AND METHOD FOR COLLECTING AND ISOLATING RADIOSOTOPES

PRIORITY

This Utility Patent Applications claims the benefit of U.S. Provisional Patent Application No. 62/727,652, filed on Sep. 6, 2018, the entirety of which is incorporated herein by reference.

CONTRACTUAL ORIGIN OF THE INVENTION

This invention was made with government support under Contract No. DE-AC02-06CH11357 awarded by the United States Department of Energy to UChicago Argonne, LLC, operator of Argonne National Laboratory. The government has certain rights in the invention.

BACKGROUND OF THE INVENTION

1. Field of the Invention

This invention relates to a system and method to isolate and purify radioisotopes and more specifically, this invention relates to a system for using resins to affect the isolation and separation of target isotopes.

2. Background of the Invention

At the time of this application, there is a surge in research and development of therapies using alpha particles to treat a variety of infectious diseases and cancers, particularly prostate and bone cancers. (An alpha particle is a fast moving packet comprised of two protons and two neutrons, so basically a charged helium nucleus). Of a number of alpha-emitting isotopes, current research and industrial interest primarily focuses on $^{225}AC$ and one of its daughter isotopes, $^{213}Bi$. The current production of $^{225}AC$ and its daughter isotopes, however, have tremendous disadvantages and are not reliably meeting demand. Further, current methods of separating $^{225}AC$ from parent isotopes have disadvantages.

For example, prior art methods involving Ra or Ac elution through a column use various organic resins as column packing material. However, the disadvantages of using these organic resins with alpha emitting isotopes are well known. For example when these organic resins are used with mCi quantities or more of Ra or Ac, complete loss of desired radionuclides has been reported. More frequently, these alpha emitters degrade the resins and thereby introduce undesirable organic impurities.

At present, $^{225}AC$ is normally generated by spallation of thorium targets with high energy protons or through milking aged stocks of $^{229}Th$ and $^{233}U$. Both methods have tremendous disadvantages. Thorium spallation generates $^{227}AC$ that cannot be separated from the desired $^{225}AC$. Milking of $^{233}U$ also generates the undesired $^{227}AC$ and has the additional disadvantage of being very limited (kg or near kg amounts of $^{233}U$ needed).

A need exists in the art for a reliable process to produce $^{225}AC$ and its daughter isotopes. The process should be reliable and cheap (relative to prior art methods), and utilize starting material that can be re-used.

SUMMARY OF INVENTION

An object of the invention is to provide a system and method for producing and collecting $^{225}AC$ and its daughter isotopes which overcomes many of the drawbacks of the prior art.

Still another object of the invention is to provide a method for producing $^{225}AC$ and its daughter isotopes from non-traditional sources. A feature of the invention is using a LINAC (linear particle accelerator) to irradiate a radium target (comprising $^{226}Ra$) to produce $^{225}Ra$, and $^{224}Ra$. An advantage of the invention is that the method is inexpensive compared to the thorium spallation or milking of aged $^{233}U$ stocks. A further advantage of the invention is that generation of the radium isotopes using a LINAC produces insubstantial amounts of the $^{227}Ac$ compared to the current methods of generating $^{225}Ac$.

Another object of the invention is to provide a method for producing and separating $^{225}Ac$ and its daughter isotopes from immobilized $^{226}Ra$ $^{225}Ra$, and $^{224}Ra$ parent isotopes. A feature of the method is immobilizing $^{226}Ra$, $^{225}Ra$, and $^{224}Ra$ on a column and milking $^{225}Ac$ and other desired isotopes ($^{213}Bi$ for example) from the column while the radium isotopes remain on the column. An advantage of the method is that desired isotopes can be regularly milked from a loaded column without loading of additional parent isotopes.

Another object of the invention is to provide a system for producing and separating $^{225}Ac$ and its daughter isotopes from immobilized $^{226}Ra$, $^{225}Ra$, and $^{224}Ra$ parent isotopes that is robust. A feature of the invention is the use of inorganic column packing material that is not destroyed by radiation. An advantage of the invention is that the system can be used to either milk or retain desired isotopes for a period of two to three months, even while using radiation that is normally detrimental to state of the art column materials.

Yet another object of the invention is to provide a system for generating isolatable $^{225}Ac$ (and its daughter isotopes) from $^{226}Ra$ where the $^{226}Ra$ is recyclable. A feature of the invention is that $^{226}Ra$ immobilized on a column in the invented process can be recovered by washing the column with excess carbonate. An advantage of the process is that expensive $^{226}Ra$ material does not have to be disposed of after one use and can recycled into new target material.

Still another object of the invention is to provide a system for regularly producing appreciable quantities of $^{225}Ac$ and its daughter isotopes from immobilized radium isotopes. A feature of the invention is the ability to regularly milk $^{225}Ac$ and its daughter isotopes from a column having immobilized radium isotopes. An advantage of the invention is that between approximately 0.1 Ci and approximately 1 Ci of $^{225}AC$ can be milked from the column depending on the mass of the radium target irradiated, dissolved, and loaded onto the column. These yields assume an exemplary radium 100 mg target mass.

Another object of the invention is to provide a method and system for isolating $^{225}AC$ and its daughter isotopes. A feature of the invention is that the $^{225}Ac$ and its daughter isotopes are immobilized on a resin column while parent isotopes (e.g., $^{226}Ra$) are eluted from the column. An advantage of the invention is its enhanced safety inasmuch as the resin, which is transported to its final elution point (hospital, clinic, etc.) does not contain longer lived isotopes. As such, leakage of more toxic radioisotopes, during transport, or exposure to those radioisotopes by dispensing personnel, is obviated.

Briefly, the invention provides a batch method for obtaining $^{225}Ac$ from $^{225}Ra$ comprising: assembling a column having a stationary phase comprising an inorganic material; priming the column to immobilize $^{226}Ra$, $^{225}Ra$, $^{224}Ra$ and natural decay products therefrom; immobilizing the $^{226}Ra$, $^{225}Ra$, $^{224}Ra$, and natural decay products therefrom onto a stationary phase within the column; and eluting the column containing the $^{225}$Ra with an aqueous sulfate solution to obtain an effluent that contains $^{225}$Ac.

Also provided is a method for obtaining pure $^{225}$Ac from its isotope parents, the method comprising assembling an ionic exchange column having a stationary phase comprising an inorganic material; priming the column with the isotope parents to immobilize $^{225}$Ac, and natural decay products of $^{225}$Ac; immobilizing the $^{225}$Ac, and natural decay products therefrom onto the stationary phase within the column; and eluting the column to obtain an effluent that contains the isotope parents. Subsequently, the column is eluted to obtain the $^{225}$Ac, and/or natural decay products as effluent.

BRIEF DESCRIPTION OF DRAWING

The invention together with the above and other objects and advantages will be best understood from the following detailed description of the preferred embodiment of the invention shown in the accompanying drawings, wherein:

FIGS. 4A-D are γ spectra taken of effluent solutions in an example of the invented method, in accordance with the features of the present invention;

DETAILED DESCRIPTION OF THE INVENTION

The foregoing summary, as well as the following detailed description of certain embodiments of the present invention, will be better understood when read in conjunction with the appended drawings.

All numeric values are herein assumed to be modified by the term "about", whether or not explicitly indicated. The term "about" generally refers to a range of numbers that one of skill in the art would consider equivalent to the recited value (e.g., having the same function or result). In many instances, the terms "about" may include numbers that are rounded to the nearest significant figure.

The recitation of numerical ranges by endpoints includes all numbers within that range (e.g., 1 to 5 includes 1, 1.5, 2, 2.75, 3, 3.80, 4, and 5).

The following detailed description should be read with reference to the drawings in which similar elements in different drawings are numbered the same. The drawings, which are not necessarily to scale, depict illustrative embodiments and are not intended to limit the scope of the invention.

As used herein, an element or step recited in the singular and preceded with the word "a" or "an" should be understood as not excluding plural said elements or steps, unless such exclusion is explicitly stated. As used in this specification and the appended claims, the term "or" is generally employed in its sense including "and/or" unless the content clearly dictates otherwise.

Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Figure 1:
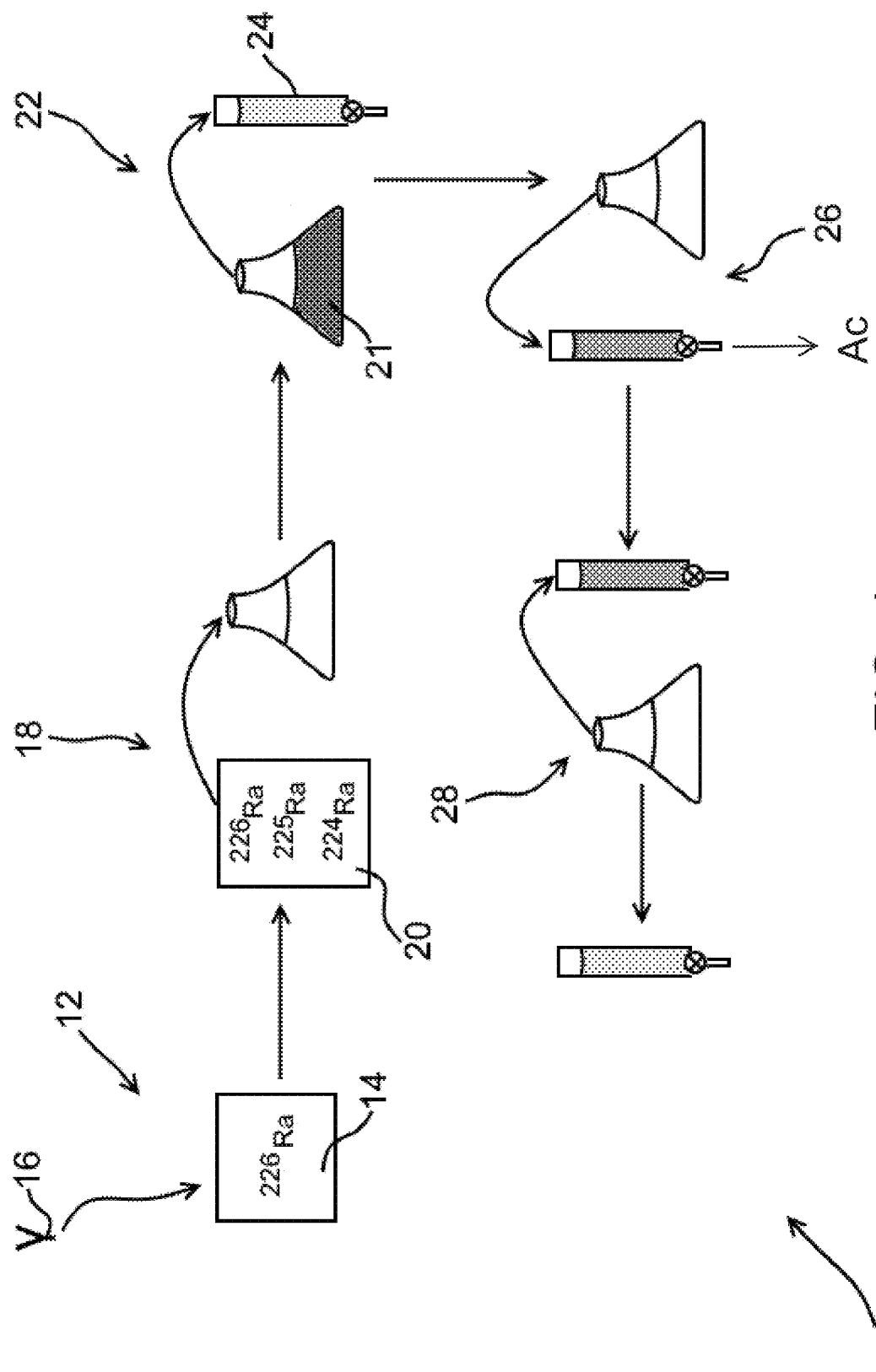
FIG. 1 is a schematic of a method for immobilizing $^{225}$Ra on a column, and milking desired products therefrom, in accordance with the features of the present invention.

The invention generally provides a system and method to produce a radium/actinium generator that can be milked for $^{225}$Ac and its daughter isotopes. FIG. 1 depicts a general schematic of the method as numeral 10. The first step 12 of the method 10 comprises irradiating $^{226}$Ra targets 14 with low energy (e.g., less than 50 MeV) bremsstrahlung photons 16 from a LINAC to generate $^{225}$Ra via equation 1 below. Some $^{224}$Ra will also be generated from the irradiating step via equation 4. In the second step 18, the irradiated targets 20 are dissolved in water or dilute acid to create a target liquor 21. In the third step 22, a column 24 is loaded with $^{226}$Ra, $^{225}$Ra, and $^{224}$Ra contained in the target liquor. $^{225}$Ra decays into $^{225}$Ac via equation 2 below. In the fourth step 26, the column is periodically milked to selectively elute $^{225}$Ac and its daughter isotopes that results from this decay while the $^{226}$Ra, $^{225}$Ra, and $^{224}$Ra remain in the column. In the fifth step 28, the column is washed to elute remaining $^{226}$Ra from the column that can be used to start the method 10 over again.

$$^{226}Ra + \gamma \rightarrow {}^{225}Ra + {}^{1}n \quad \text{Equation 1}$$

$$^{225}Ra \rightarrow {}^{225}Ac + \beta + \text{decay products} \quad \text{Equation 2}$$

$$^{224}Ra \rightarrow {}^{220}Rn + \alpha + \text{decay products} \quad \text{Equation 3}$$

$$^{226}Ra \rightarrow {}^{224}Ra + 2{}^{1}n + \text{decay products} \quad \text{Equation 4}$$

Generation of $^{225}$Ra Parent Isotope Detail

As stated above and shown in FIG. 1, the instant method uses a LINAC to irradiate $^{226}$Ra targets in order to generate $^{225}$Ra within the targets. An exemplary LINAC that may be used in the current method is at Argonne National Laboratory in Lemont, Ill. Argonne's LINAC has a maximum energy of approximately 55 MeV, a power of approximately 25 kW at 25-35 MeV, and a peak current of approximately 2.5 A. Though Argonne's LINAC is the envisioned LINAC to be used in conjunction with this method, any LINAC or alternative method for delivering bremsstrahlung photons to $^{226}$Ra targets to generate $^{225}$Ra via equation 1 is suitable. The LINAC should have an energy level of between approximately 5 MeV and approximately 50 MeV, a power level of between approximately 5 kW and approximately 30 kW, and run at an exemplary current of approximately 0.5 mA. The targets comprise radium salts. Suitable and exemplary radium salts are radium nitrate, radium chloride, and combinations thereof.

After irradiation, the irradiated targets are dissolved in aqueous solution. Exemplary aqueous solutions include $H_2O$, dilute HCl (pH of 1 at the lowest), dilute $HNO_3$ (pH of 1 at the lowest), NaCl, $NaNO_3$ and combinations thereof.

In the third step 22 of the invented method, dissolved $^{226}$Ra, $^{225}$Ra, and $^{224}$Ra are loaded onto a column to remain there while generated, desired isotopes are selectively eluted from the column.

Figure 2:
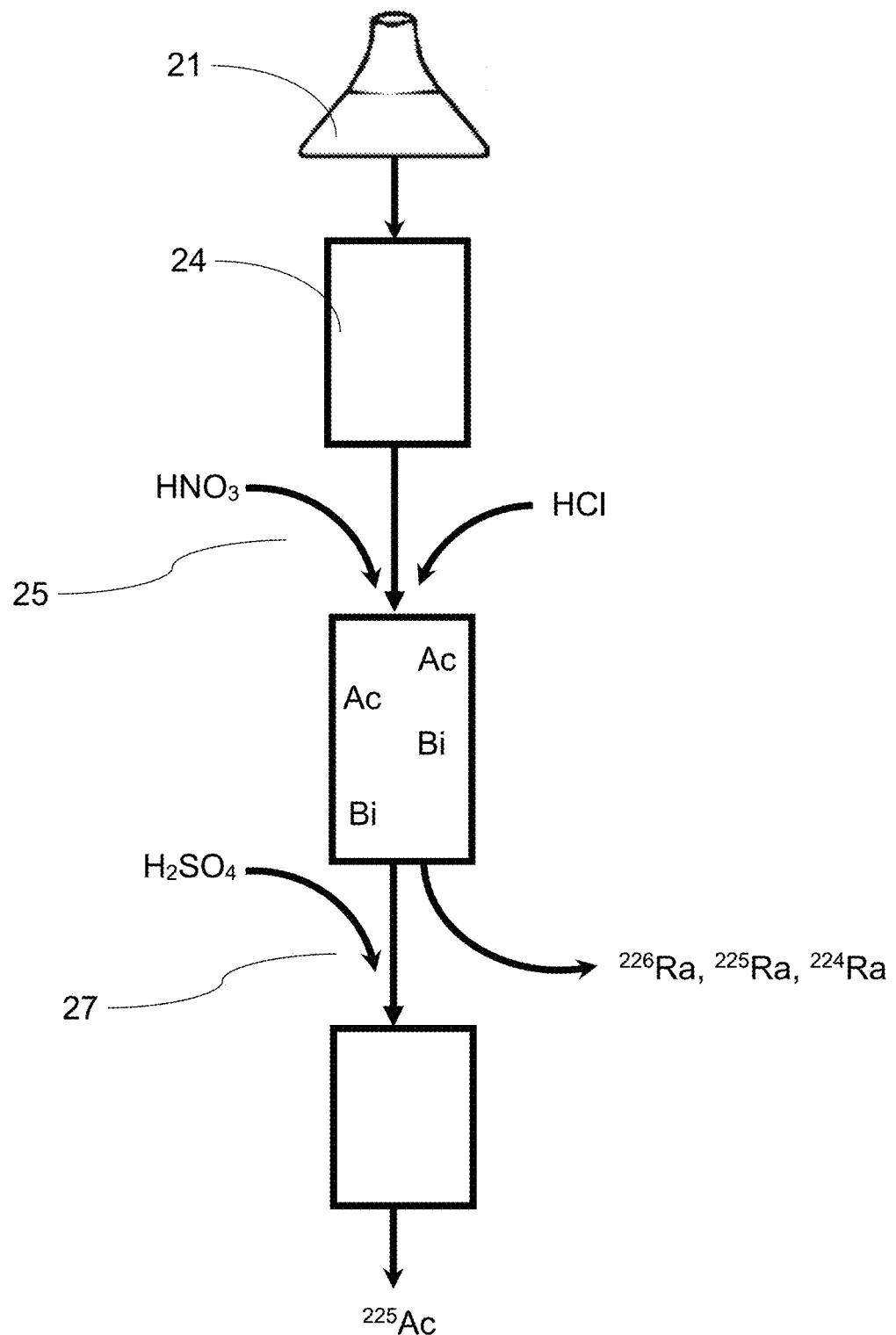
FIG. 2 is a schematic depiction of a method for immobilizing $^{225}$Ac on a column, and eluting undesired parent isotopes therefrom, in accordance with the features of the present invention.

FIG. 2 depicts a reverse paradigm than what FIG. 1 presents. As in the first protocol, a target liquor 21 is loaded onto a column 24. But then, mineral acids such as nitric or hydrochloric is added in a parent isotopes elution step 25 to remove $^{226}$Ra, $^{225}$Ra, and $^{224}$Ra.

Lastly, sulfuric acid is added in a second elution step 27 to remove the actinium and bismuth.

Column Detail

The inventors have discovered that inorganic stationary phases are robust when used along with the radionuclides present throughout the instant method and do not have the disadvantage of prior art resins. Exemplary inorganic resins include alumina, titanates, niobates, zirconates, and combinations thereof. Titania particles produced by ZirChrom Separations, LLC of Anoka, Minn. sold under the brand name SACHTOPORE® have been identified as a suitable, commercially available stationary phase for use with this invention. This exemplary phase has an average particle diameter of about 110 µm and average pore sizes of about 60 Å.

In practice, the size of the column and amount of sorbent used can be customized to suit the amount of $^{226}$Ra, $^{225}$Ra, and $^{224}$Ra to be initially loaded on the column. To prepare this column, approximately 1 to approximately 3 grams of titania sorbent stationary phase (SACHTOPORE®) are loaded into a column and washed with distilled water until the effluent is clear. The column is then washed with HCl (of pH 1 or higher) followed by $H_2SO_4$ (having a pH of 1 or higher).

A salient feature of the invention is the priming of the column with hydroxide after washing with HCl and $H_2SO_4$ and before loading the column with $^{226}$Ra, $^{225}$Ra, and $^{224}$Ra. The hydroxide priming step comprises eluting the column with an aqueous hydroxide solution ranging in hydroxide concentration between approximately 0.01 M and approximately 0.1 M until the effluent is basic. Any hydroxide solution in this concentration range is suitable. Exemplary, suitable hydroxide solutions are NaOH, KOH, LiOH, NH$_4$OH, and combinations thereof. Surprisingly and unexpectedly, this hydroxide priming step causes strong adsorption of the $^{226}$Ra, $^{225}$Ra, and $^{224}$Ra onto the titania stationary phase during the loading step 22 below.

Column Loading, Elution, and Recycling Protocol Detail

Figure 3:
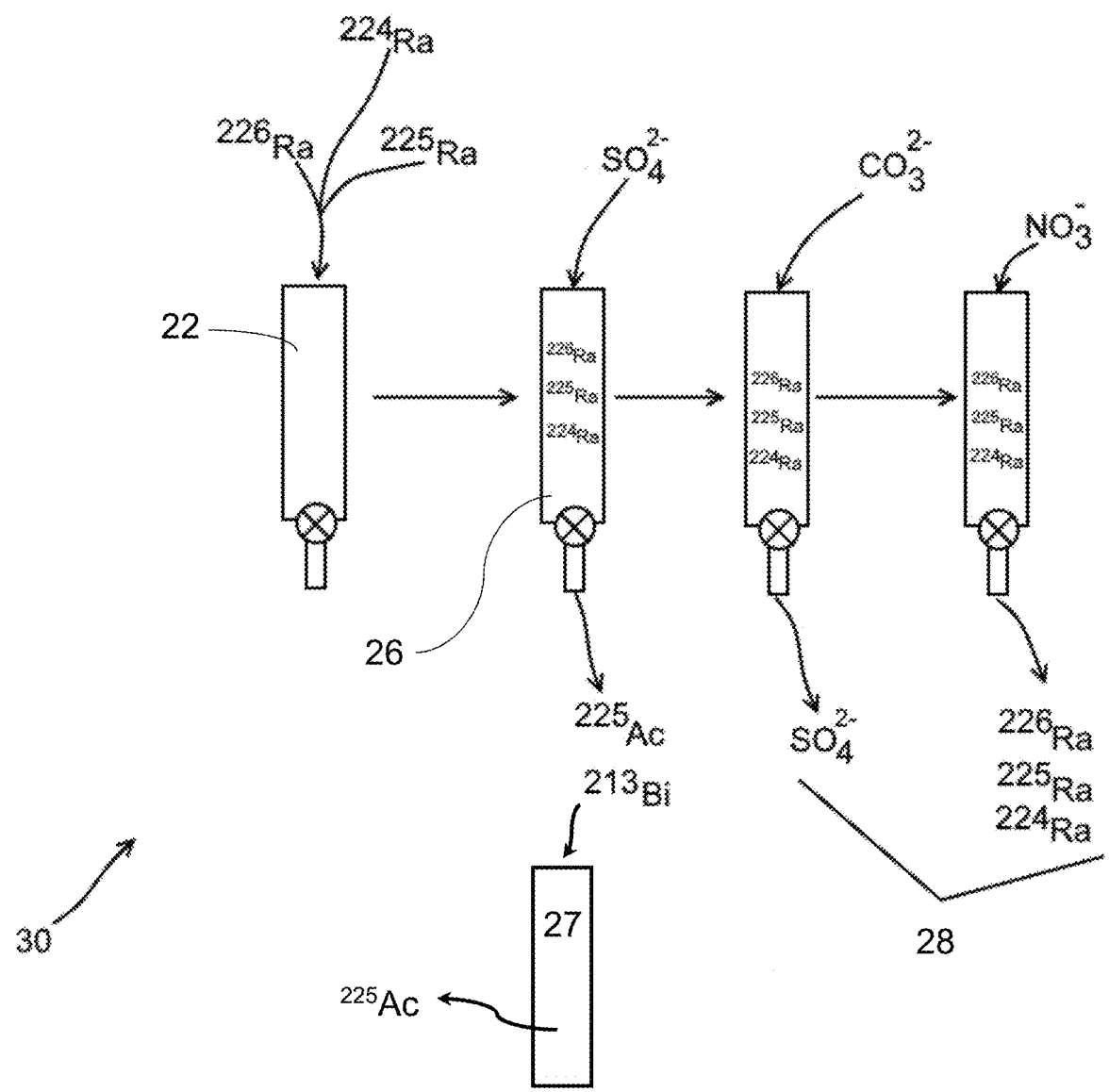
FIG. 3 is a schematic detailing the loading, milking, and recycling steps of the invented method, in accordance with the features of the present invention.

FIG. 3 is a schematic labelled as numeral 30 that provides more detail of the loading step 22, milking step 26, and $^{226}$Ra recycling step 28 shown generally in FIG. 1. After the column is assembled and primed according to protocol detailed above, $^{226}$Ra, $^{225}$Ra, and $^{224}$Ra contained in the target liquor 21 are loaded onto the column. The loading step 22 comprises running the solution containing the dissolved targets through the hydroxide primed column. With this loading step, the $^{226}$Ra, $^{225}$Ra, and $^{224}$Ra dissolved in the target liquor adsorbs onto the titania stationary phase as hydrolyzed species (likely Ra(OH)$_2$ and Ac(OH)$_3$). After loading, the column is rinsed with a $H_2SO_4$ (approximately 0.01 M to approximately 0.05 M in concentration). This $H_2SO_4$ solution may also contain (NH$_4$)$_2$SO$_4$. This rinse will likely contain $^{225}$AC and daughter isotopes generated subsequent to the initial radiation of the $^{226}$Ra targets in the initial step shown in FIG. 1 above. As such, the effluent from the $H_2SO_4$ wash should be subjected to testing to determine whether there is sufficient $^{225}$AC to be isolated.

Upon loading and washing a column as described above, the loaded column can be milked 26 for $^{225}$AC and desired daughter isotopes. In an embodiment, the column is milked once a week after loading. The milking step 26 comprises eluting the column with 20 to 40 mL of approximately 0.01 M to approximately 0.05 M $H_2SO_4$ or a solution containing a combination of $H_2SO_4$ and (NH$_4$)$_2$SO$_4$ resulting in a sulfate ion concentration similar or equivalent to the aforementioned concentration range of $H_2SO_4$ by itself. This milking step creates Ra, Ac and Bi sulfates. The Ac and Bi sulfates are soluble in the aqueous $H_2SO_4$ solution and exit the column. The Ra sulfates, however, are insoluble and remain in the column.

Effluent from this step will contain any $^{225}$AC and desired daughter isotopes that have been generated by decay of $^{226}$Ra, $^{225}$Ra, and $^{224}$Ra immobilized on the column. Protocols to separate $^{225}$AC from its daughter isotopes include eluting the eluent from the milking step above through an anion exchange column 27 packed with AG® MP-1 strong anion exchange resin produced by BIO-RAD of Hercules, Calif. A suitable separation protocol can be found in F. Nelson, K. A. Kraus, J. Am. Chem. Soc., 1954, Vol 76, page 5916-5920, the entirety of which is hereby incorporated by reference.

After the last milking, any $^{226}$Ra, $^{225}$Ra, and $^{224}$Ra are removed from the column in a recycling step 28. In this step, the column is contacted with excess carbonate solution, the contact maintained for approximately 8 to approximately 24 hours. Suitable carbonate solutions include saturated solutions of (NH$_4$)$_2$CO$_3$, saturated Na$_2$CO$_3$, and combinations thereof. During the contacting of the column with carbonate solution, radium sulfate is converted to radium carbonate according to equation 5 below. The insoluble radium carbonate remains on the column.

$$RaSO_4 + CO_3^{2-} \rightarrow RaCO_3 + SO_4^{2-} \qquad \text{Equation 5}$$

After the carbonate solution, the column is contacted with a dilute solution of HNO$_3$ (between approximately 1 M to approximately 5 M in concentration). With this nitric acid wash, the insoluble radium carbonate converts to soluble radium nitrate via equation 6 below and elutes from the column. The effluent, resulting from the nitric acid wash, will contain most of the $^{226}$Ra (and non-decayed $^{225}$Ra and $^{224}$Ra) that remain in the column. Recovered $^{226}$Ra may be recycled and used again in the instant method.

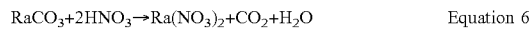

$$RaCO_3 + 2HNO_3 \rightarrow Ra(NO_3)_2 + CO_2 + H_2O \qquad \text{Equation 6}$$

The above described processes for actinide milking can be adapted in the paradigm depicted in FIG. 2 in appropriate places for parent isotope elution, and final target isotope extraction. Generally, the protocol depicted in FIG. 2 will comprise the following steps:

1) Dissolving radium targets;
2) Adjusting pH to somewhere between 1 and 5 with a dilute mineral acid;
3) Feeding the slurry through the pre-equilibrated column;
4) Subsequent column washing steps; and
5) Eluting the desired actinium from the column with a dilute mineral acid.

Example 1

The instant method was performed using 226Ra and its natural decay products. To begin, a column was prepared with approximately 1-3 grams of titania particles (SACHTOPORE®). The column was first washed with water until the effluent was clear. Subsequently, the column was washed with approximately 8 M HCl, followed by 1 M $H_2SO_4$. Following the $H_2SO_4$ wash, the column was washed with 3 bed volumes of water. The column was then activated through elution of NaOH aliquots varying in concentration between approximately 0.1 M and approximately 1 M until the effluent was basic. To load the column, approximately 1 nCi of $^{226}$Ra was dissolved in 10 mL in $H_2O$ to generate a target liquor. FIG. 4A shows a γ spectrum of that target liquor. This spectrum shows the presence of $^{226}$Ra and its natural decay products $^{214}$Pb and $^{214}$Bi.

Figure 4B:
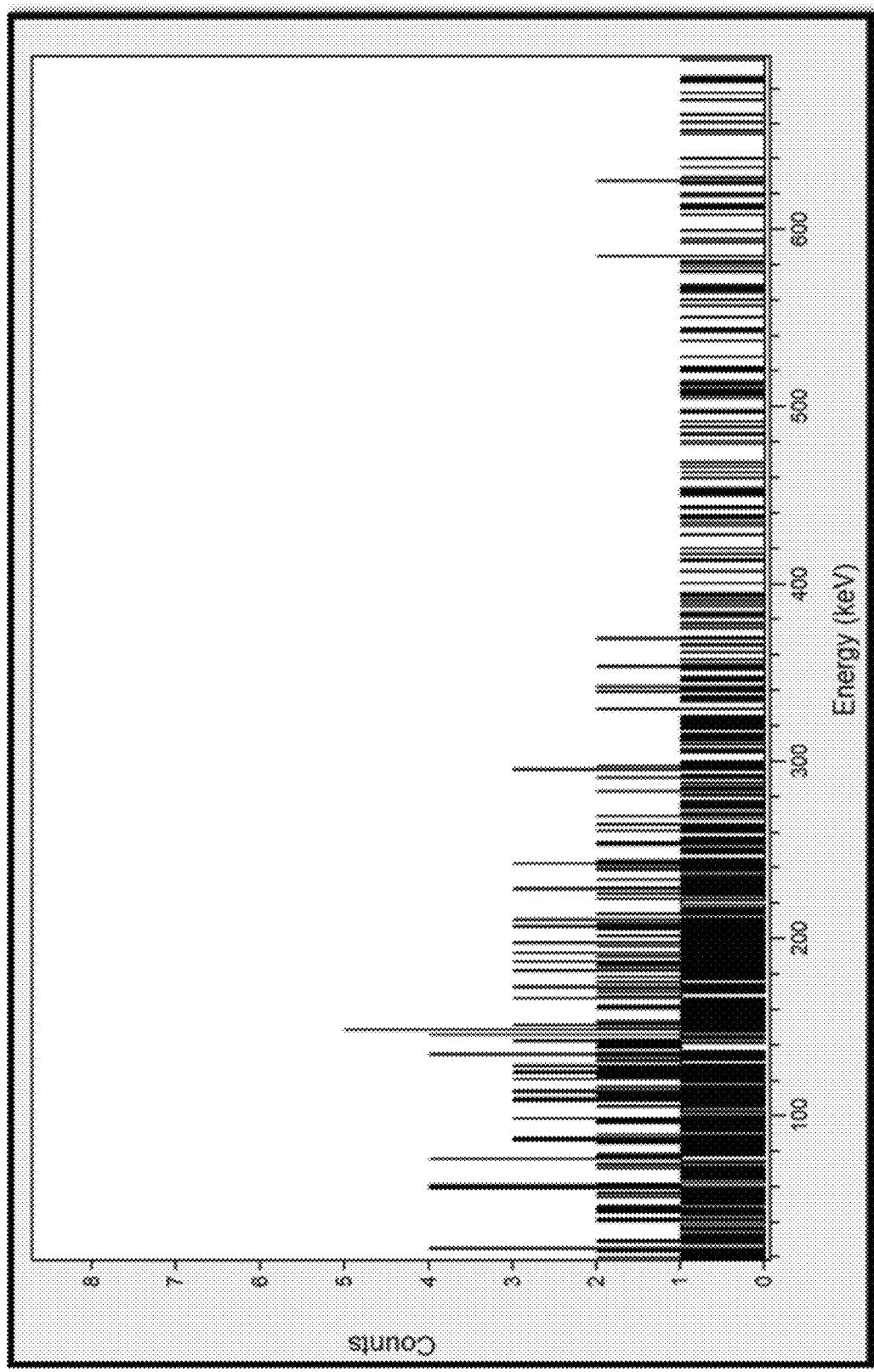

The target liquor was then eluted through the column. A γ spectrum was also taken of the target liquor after elution through the column which is shown as FIG. 4B. As shown in FIG. 4B, the $^{226}$Ra and its natural decay products were retained by the column. After elution of the target liquor, the column was washed with approximately 2 mL 0.1 M $H_2SO_4$ followed by approximately 2 mL of water until the effluent was pH neutral.

Figure 4C:
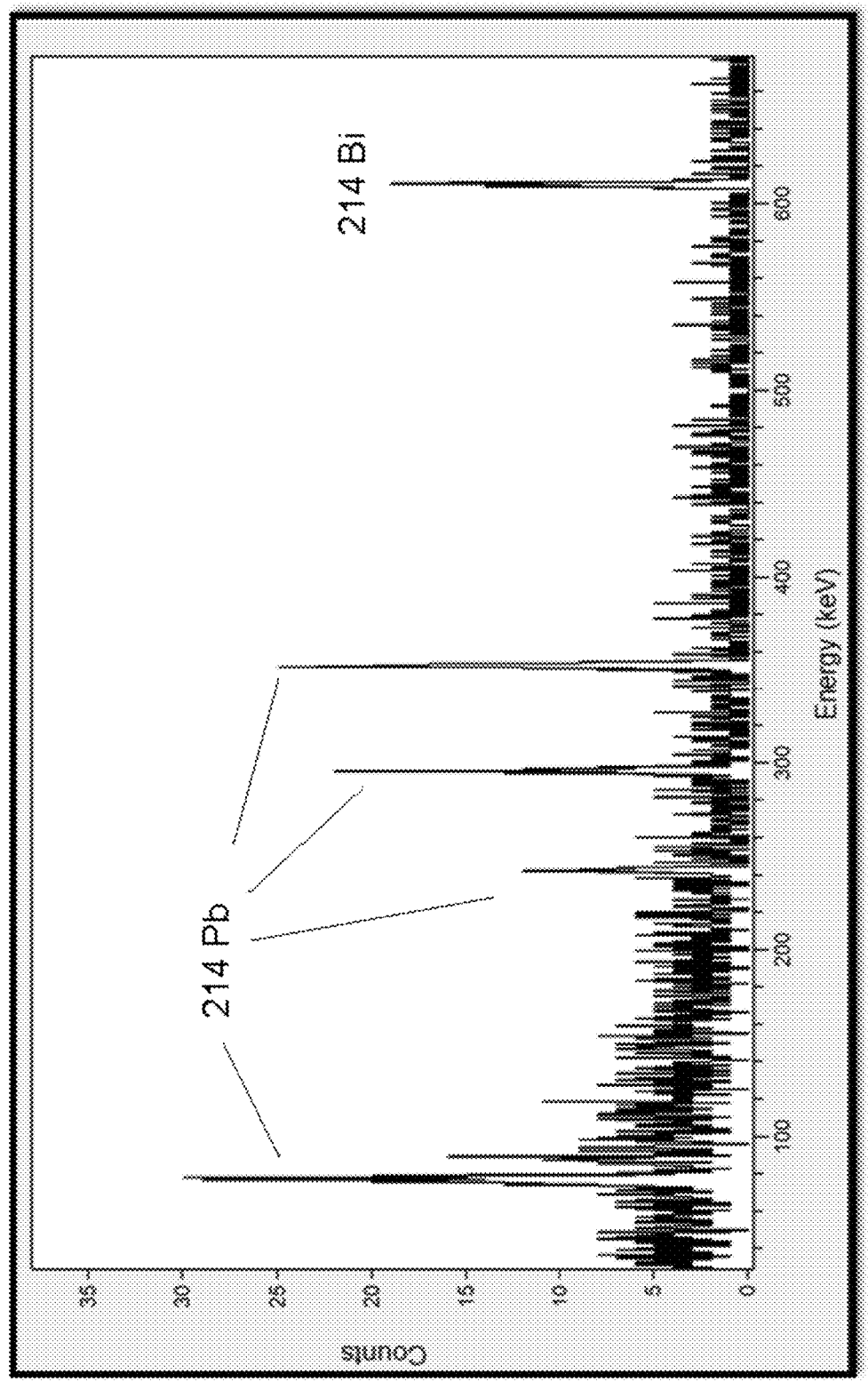

Decay products of $^{226}$Ra were milked from the loaded column through elution of approximately 2 mL of 6M HCl with approximately 0.001 M $NaHSO_4$. A γ spectrum was taken of the milking effluent. That spectrum is shown as FIG. 4C. Looking to FIG. 4C, the spectrum indicates the presence of the $^{214}$Pb and $^{214}$Bi natural decay products of $^{226}$Ra. Notably, there is no peak for $^{226}$Ra in the milking effluent. Such a peak would be expected at about 186 keV. This indicates that the column retains the $^{226}$Ra during milkings.

To demonstrate the recoverability of the $^{226}$Ra in the invented method, after the last milking of the column tested in this example, the column was contacted overnight with a saturated, stagnant solution of $Na_2CO_3$. The $Na_2CO_3$ solution was then decanted and the column contacted with 5 M $HNO_3$ until bubbling from the column ceased. This solution was removed and counted (the γ spectrum of this solution shown as FIG. 4D). As shown in FIG. 4D, the recycling protocol used here removed a significant portion of the $^{226}$Ra remaining on the column.

Example 2

Elution of Ac off a column loaded with immobilized Ra was simulated using barium and europium. Approximately 1 gram of SACHTOPORE® normal phase resin was loaded into a column support (1.3 cm×2 cm). The resin was washed with water followed by 0.1 M NaOH until the effluent was basic (determined by pH paper). A 4 mL solution containing 100 mg of $BaCl_2$ and 4000 Bq of Eu-152 in pH 6 was fed into the column by gravity. The solution exited the column at approximately 1 drip/second. The eluent showed no signs of Eu-152. The loaded resin was then washed with 2 mL of 0.1M $H_2SO_4$. Gamma-analysis showed that over 95% of the Eu-152 was recovered in this step. No barium was observed in this solution; qualitatively determined by sulfate precipitates.

Example 3

A stock of Ra-228/Ac-228 was prepared from an aged batch of thorium nitrate (estimated 30-40 years) using solvent extraction and ion exchange. The final pH of the solution was approximately three according to pH indicator. The purity was confirmed by the consistent decay of Ra-224 (Th-228). The solution was allowed to age for one month before use.

Titania resin (Sachtopore) was packed into a 1×10 cm column support, washed with de-ionized water followed by approximately 10 bed volumes of 0.1M NaOH. Using gravity flow, the Ra-228/Ac-228 stock was fed through the column and washed with water. Neither the eluent nor the wash fractions contained activity of Ra-228 or Ac-228. The column was then contacted with 8 mL of 0.1M sulfuric acid to elute pure Ac-228.

Figure 5:
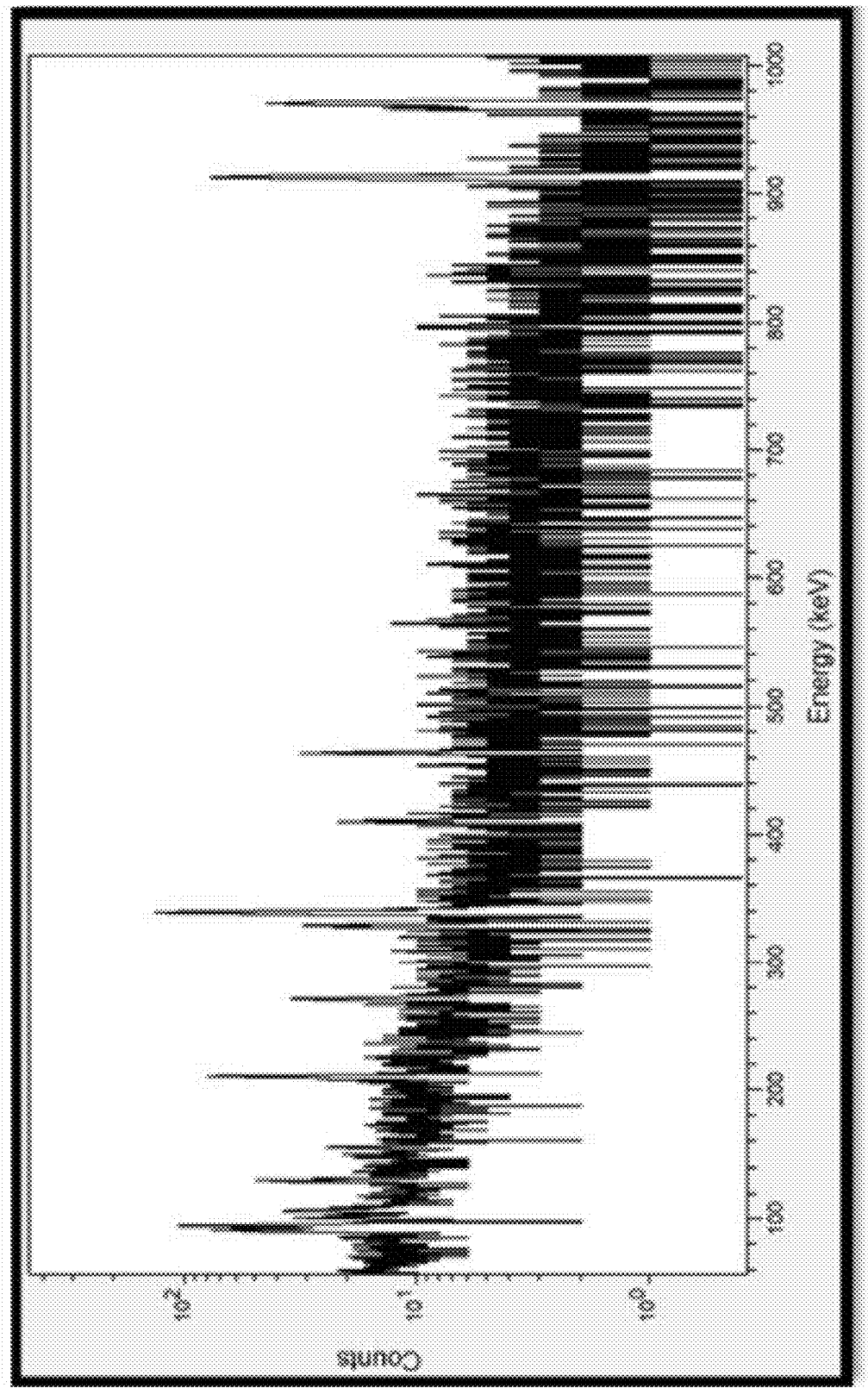
FIG. 5 is a graph of a High Purity Germanium spectrum of isolated actinium-228, in accordance with features of the present invention.

FIG. 5 is a graph of a High Purity Germanium spectrum of the isolated actinium, in accordance with features of the present invention. (An HPGe detector converts gamma rays into electrical impulses which can be used, with suitable signal processing, to determine their energy and intensity.) FIG. 5 shows photo-peaks at 338 and 911 keV, indicative of the presence of Ac-228.

Using the photopeaks at 338 and 911 keV in FIG. 5, a series of measurements were carried out over 15 hours and are plotted below.

Figure 6:
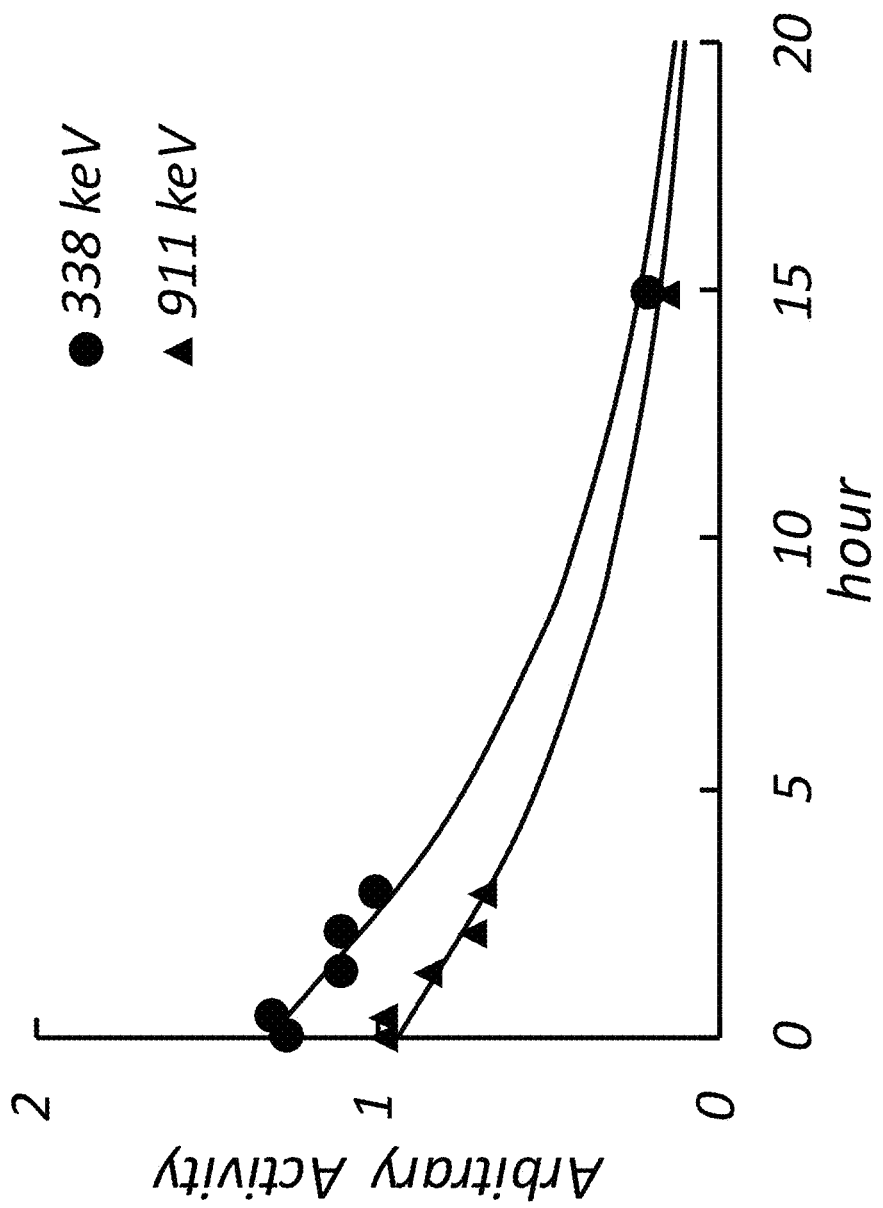
FIG. 6 is a plot of the activity of isolated actinium isotope showing its purity, in accordance with features of the present invention.

FIG. 6 represents this plot, which is a measure of AC-228 activity over a period of about 18 hours. The solid circles and triangles represent the experimental data, while the solid lines represent a half-life of 6.1 hours.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting, but are instead exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," "more than" and the like include the number recited and refer to ranges which can be subsequently broken down into subranges as discussed above. In the same manner, all ratios disclosed herein also include all subratios falling within the broader ratio.

The invention claimed is:

1. A method for obtaining $^{225}$Ac from its isotope parents, the method comprising:
   a) assembling a column having a stationary phase comprising an inorganic material;

b) priming the column with the isotope parents;

c) immobilizing the $^{225}$Ac, and natural decay products therefrom onto the stationary phase within the column; and d) eluting the column containing the $^{225}$Ac to obtain an effluent that contains the isotope parents wherein the priming step further comprises eluting an aqueous solution containing free hydroxide ions until the effluent of the column is basic.

2. The method as recited in claim 1 wherein the eluting step comprises contacting the column with a mineral acid selected from the group consisting of hydrochloric acid, nitric acid, sulfuric acid, perchloric acid, and combinations thereof.

3. The method as recited in claim 1 wherein the $^{225}$Ac, immobilized on the column remains on the column after step d).

4. The method as recited in claim 1 wherein the inorganic material is a compound selected from the group consisting of alumina, zirconate, titanate, niobate, and combinations thereof.

5. A method for obtaining $^{225}$Ac from its isotope parents, the method comprising:

a) assembling a column having a stationary phase comprising an inorganic material;

b) priming the column with the isotope parents;

c) immobilizing the $^{225}$Ac, and natural decay products therefrom onto the stationary phase within the column; and d) eluting the column containing the $^{225}$Ac to obtain an effluent that contains the isotope parents wherein the immobilizing step further comprises:

e) eluting an aqueous solution containing $^{226}$Ra, $^{225}$Ra, $^{224}$Ra, and natural decay products therefrom through the column;

f) eluting a dilute solution of $H_2SO_4$ through the column; and g) eluting water through the column until the effluent has neutral pH.

6. The method as recited in claim 5 wherein the eluting step comprises contacting the column with a mineral acid selected from the group consisting of hydrochloric acid, nitric acid, sulfuric acid, perchloric acid, and combinations thereof.

7. The method as recited in claim 5 wherein the $^{225}$Ac, immobilized on the column remains on the column after step d).

8. The method as recited in claim 5 wherein the inorganic material is a compound selected from the group consisting of alumina, zirconate, titanate, niobate, and combinations thereof.

* * * * *